United States Patent
Kim et al.

(10) Patent No.: US 7,812,833 B2
(45) Date of Patent: Oct. 12, 2010

(54) LIQUID CRYSTAL DISPLAY DEVICE AND METHOD OF DRIVING THE SAME

(75) Inventors: Jin-Sung Kim, Gyeongsengbuk-do (KR); Hyun-Taek Nam, Daegu (KR)

(73) Assignee: LG Display Co., Ltd., Seoul (KR)

( * ) Notice: Subject to any disclaimer, the term of this patent is extended or adjusted under 35 U.S.C. 154(b) by 880 days.

(21) Appl. No.: 11/646,268

(22) Filed: Dec. 28, 2006

(65) Prior Publication Data

US 2008/0117158 A1  May 22, 2008

(30) Foreign Application Priority Data

Nov. 22, 2006  (KR) ............................ 2006-0115645

(51) Int. Cl.
*G09G 3/36* (2006.01)
(52) U.S. Cl. ........................................ 345/204; 345/99
(58) Field of Classification Search ................ 345/103, 345/87, 98, 94, 99, 204
See application file for complete search history.

(56) References Cited

U.S. PATENT DOCUMENTS 7,528,821 B2 * 5/2009 Baek et al. .................. 345/103

* cited by examiner

*Primary Examiner*—Amare Mengistu
*Assistant Examiner*—Joseph G Rodriguez
(74) *Attorney, Agent, or Firm*—Morgan Lewis & Bockius LLP

(57) ABSTRACT

A liquid crystal display device is disclosed. The disclosed liquid crystal display includes a liquid crystal panel having a plurality of data lines and a plurality of gate lines. The disclosed liquid crystal display device also includes a timing controller to receive a data enable signal and a data signal, and to output a gate shift clock, a gate output enable signal, and a source output enable signal, wherein at least one of the gate output enable signal and the source output enable signal is maintained at a predetermined level for at least two cycles of the gate shift clock based on a state of the data enable signal. In addition, the disclosed liquid crystal display device includes a source driver to supply the data lines with corresponding data voltage signals based on the data signal and the source output enable signal, and a gate driver to supply the gate lines with corresponding gate voltage signals based on the gate output enable signal.

15 Claims, 5 Drawing Sheets

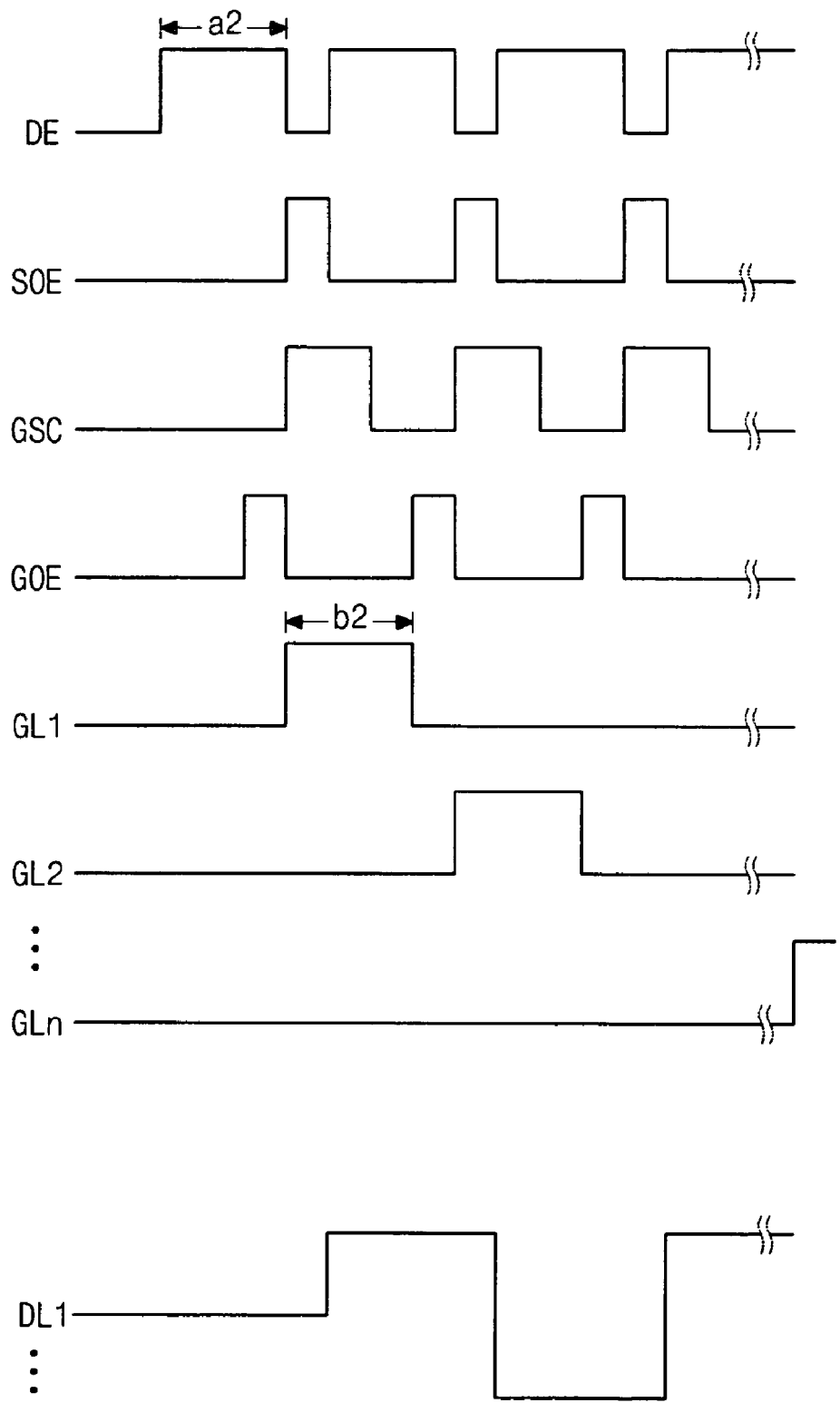

LIQUID CRYSTAL DISPLAY DEVICE AND METHOD OF DRIVING THE SAME

This application claims the benefit of priority of Korean Patent Application No. 2006-0115645, filed on Nov. 22, 2006, which is hereby incorporated by reference for all purposes as if fully set forth herein.

BACKGROUND OF THE INVENTION

1. Field of the Invention

The present invention relates to a liquid crystal display device, and more particularly, to a liquid crystal display device and method for driving the same.

2. Description of the Related Art

Conventionally, cathode-ray tubes (CRTs) have been used as display devices. Presently, much effort is being made to study and develop various types of flat panel displays, such as liquid crystal display (LCD) devices, plasma display panels (PDPs), field emission displays (FEDs), and electro-luminescence displays (ELDs), as a substitute for CRTs. These flat panel displays may be driven by an active matrix driving method in which a plurality of pixels arranged in a matrix configuration are driven using a plurality of corresponding thin film transistors. Among these active matrix type flat panel displays, liquid crystal display (LCD) devices and electroluminescent display (ELD) devices are widely used for notebook computers and desktop monitors, among others, because of their high resolution, ability to display colors, and superiority in displaying moving images.

In general, an LCD device includes two substrates that are spaced apart and face each other with a layer of liquid crystal interposed between the two substrates. The two substrates typically include electrodes that face each other such that a voltage applied between the electrodes induces an electric field across the layer of liquid crystal. The alignment of the liquid crystal molecules changes based on the intensity of the induced electric field, thereby changing the light transmissivity of the LCD device. Thus, the LCD device displays images by varying the intensity of the electric field across the layer of liquid crystal.

FIG. 1 is a block diagram illustrating an LCD device according to the related art. As shown in FIG. 1, the LCD device includes a liquid crystal panel 12, a driving circuit having gate and source drivers 8 and 10 and a timing controller 6, and an interface 4. The interface 4 is supplied with control signals and data signals from an exterior system 2, and transfers those signals to the timing controller 6. The timing controller 6 generates control signals to control the gate and source drivers 8 and 10. The timing controller 6 processes data signals and supplies the processed data signals to the source driver 10. The gate driver 8 is controlled by the control signals from the timing controller 6 and outputs gate voltage signals. The source driver 10 is controlled by the control signals from the timing controller 6 and outputs data voltage signals.

FIGS. 2A and 2B are waveform views illustrating control signals and gate and data voltage signals when a data enable signal has a normal state and an abnormal state, respectively, in the related art LCD device.

As illustrated in FIG. 2A, in a normal state operation, a data enable signal DE of a normal state having a normal width a1 is supplied. Accordingly, a gate output enable signal GOE, a gate shift clock GSC and a source output enable signal SOE of a normal state (i.e., having normal widths) are generated. Then, the gate driver 8 outputs gate voltage signals to respective gate lines GL1-GLn, and the source driver 10 outputs data voltage signals to respective data lines DL1-DLm based on the normal width a1 of the data enable signal DE. In other words, when the data enable signal DE has a normal width a1, the gate voltage signals have a normal width b1. Accordingly, the LCD device operates in a normal state.

However, when the power is initially turned on, or when various events such as a resolution change in the external system (2 of FIG. 1) occur, an abnormal data enable signal DE may be supplied. This may lead to an abnormal state operation. As illustrated in FIG. 2B, in the event that the width of the data enable signal DE abnormally decreases to a2, which is smaller than the normal width a1, then the widths of the gate output enable signal GOE and gate shift clock GSC pulses decrease correspondingly. As a result, the width of the gate voltage signals supplied to gate lines GL1 to GLn also decreases accordingly to b2, which is smaller than the normal width b1.

Accordingly, in the above abnormal state operation, the thin film transistors (TFTs) (not shown) in the LCD panel 12 are turned on for a shorter period of time than in the normal operation. As a result, the amount of time for charging pixel electrodes with corresponding data voltage signals through corresponding data lines DL1-DLm and thin film transistors (TFTs) is reduced. FIGS. 2A and 2B illustrate the data voltage signal supplied to one of the data lines (DL1) in the liquid crystal panel 12. The data voltage signal supplied to data line DL1 is inverted alternately with positive and negative polarities with each gate line.

Because the charging time is reduced, the pixel electrodes may not be charged sufficiently with corresponding data voltage signals. Thus, when the LCD device is operated with a normally white mode, for example, a flickering of white lines can occur. If this condition persists, it may lead to a degradation of display quality and deterioration of liquid crystal.

SUMMARY OF THE INVENTION

Accordingly, the present invention is directed to a liquid crystal display and a method of driving the same that substantially obviates one or more of the problems due to limitations and disadvantages of the related art.

An advantage of the present invention is to provide a liquid crystal display device and a method of driving the same that can improve a display quality and reduce deterioration of liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings To achieve these and other advantages and in accordance with the purpose of the present invention, as embodied and broadly described, a liquid crystal display device includes: a liquid crystal panel having a plurality of data lines and a plurality of gate lines; a timing controller to receive a data enable signal and a data signal, and to output a gate shift clock, a gate output enable signal, and a source output enable signal, wherein at least one of the gate output enable signal and the source output enable signal is maintained at a predetermined level for at least two cycles of the gate shift clock based on a state of the data enable signal; a source driver to supply the data lines with corresponding data voltage signals based on the data signal and the source output enable signal; and a gate driver to supply the gate lines with corresponding gate voltage signals based on the gate output enable signal.

In another aspect, a method of driving a liquid crystal display device having a plurality of data lines and a plurality of gate lines, the method including: receiving a data enable signal and a data signal; outputting a gate shift clock, a gate output enable signal, and a source output enable signal, wherein at least one of the gate output enable signal and the source output enable signal is maintained at a predetermined level for at least two cycles of the gate shift clock based on a state of the data enable signal; supplying the data lines with corresponding data voltage signals based on the data signal and the source output enable signal; and supplying the gate lines with corresponding gate voltage signals based on the gate output enable signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B are waveform views illustrating control signals and gate and data voltage signals when a data enable signal has a normal state and an abnormal state, respectively, in the related art LCD device;

DETAILED DESCRIPTION OF THE PREFERRED EMBODIMENTS

Reference will now be made in detail to embodiments of the present invention, examples of which are illustrated in the accompanying drawings.

Figure 3A:
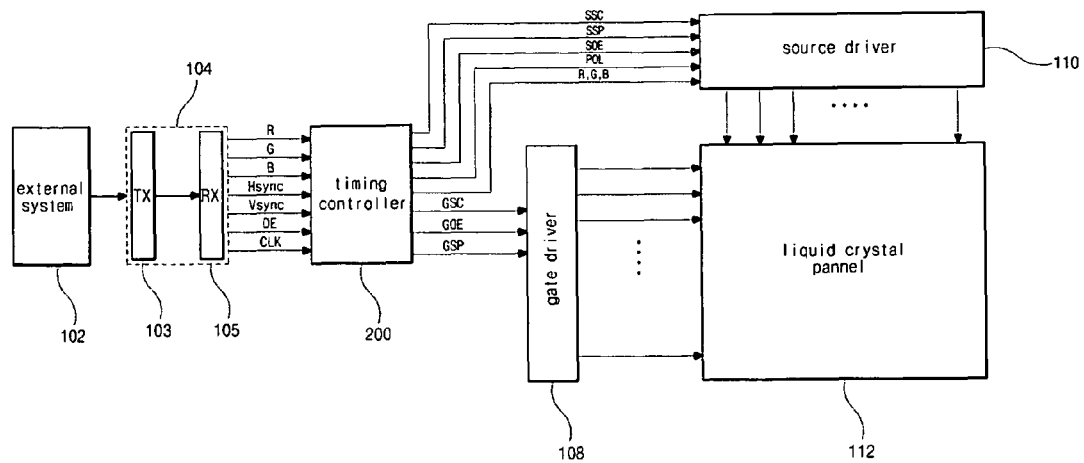
FIG. 3A is a block diagram illustrating an LCD device according to an embodiment of the present invention.
Figure 3B:
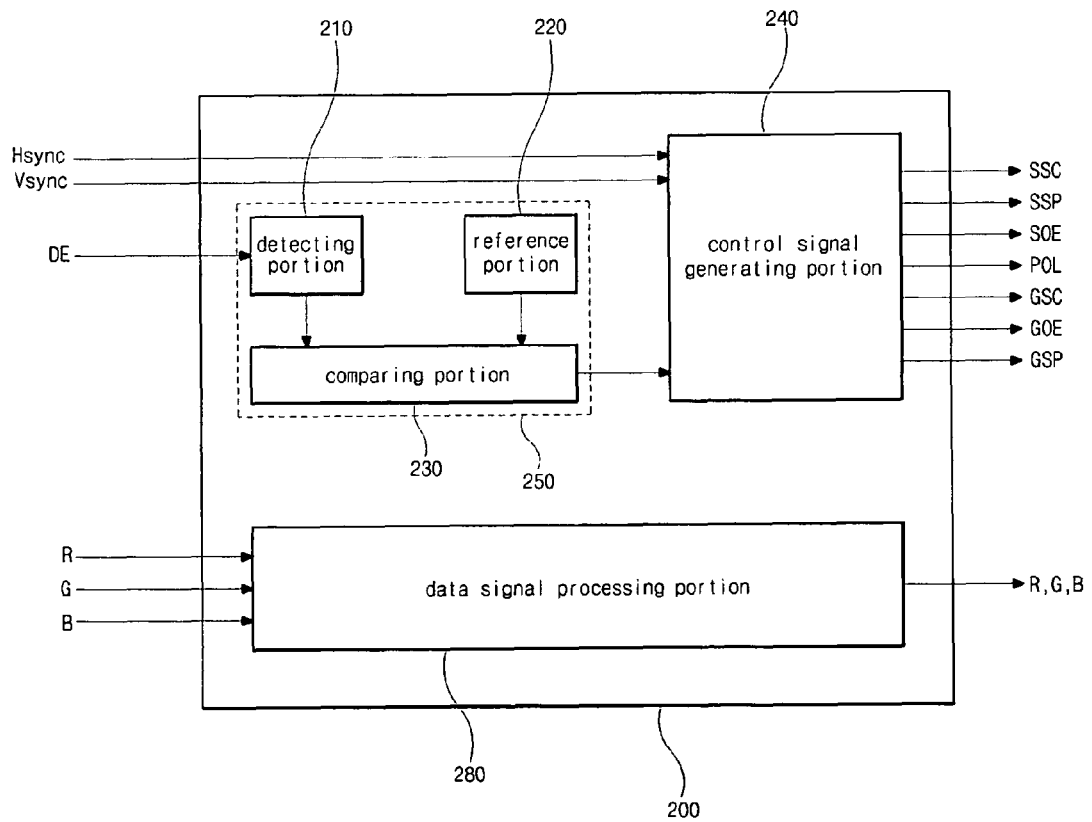
FIG. 3B is a block diagram illustrating a timing controller of FIG. 3A.

FIG. 3A is a block diagram illustrating an LCD device according to an embodiment of the present invention, and FIG. 3B is a block diagram illustrating a timing controller of FIG. 3A. As shown in FIGS. 3A and 3B, the LCD device according to an embodiment of the present invention includes a liquid crystal panel 112, a driving circuit having gate and source drivers 108 and 110 and a timing controller 200, and an interface 104.

Although not illustrated in the drawings, the liquid crystal panel 112 includes a plurality of pixels. The liquid crystal panel 112 includes a plurality of gate lines along a horizontal direction and a plurality of data lines along a vertical direction. The pixels are each connected to their corresponding gate and data lines. Each pixel includes a thin film transistor connected to the corresponding gate and data lines, and a liquid crystal capacitor having a pixel electrode, a common electrode and a liquid crystal layer between the pixel and common electrodes. The thin film transistor is turned on or off by the corresponding gate voltage signal.

The interface 104 transfers various signals between an external system 102, such as a graphic card, and the LCD device. The interface 104 may be of an LVDS type having a transmission portion TX and a receiving portion RX. Alternatively, the interface 104 may be of a TTL/CMOS type. The interface 104 is supplied with red (R), green (G) and blue (B) data signals and control signals such as a horizontal synchronization signal Hsync, a vertical synchronization signal Vsync, a data enable signal DE, and a clock signal CLK. Then, the interface 104 transfers those signals to the timing controller 200.

The timing controller 200 generates control signals to control the gate and source drivers 108 and 110 using the control signals supplied from the interface 104. The timing controller 200 outputs control signals, such as a source sampling clock SSC, a source start pulse SSP, a source output enable signal SOE, and a polarity reverse signal POL, to the source driver 110. The timing controller 200 also outputs control signals, such as a gate shift clock GSC, a gate output enable signal GOE, and a gate start pulse GSP, to the gate driver 108. Further, the timing controller 200 processes the red (R), green (G) and blue (B) data signals and outputs those to the source driver 110.

The horizontal synchronization signal Hsync determines a horizontal period to display a horizontal line of a frame image. The vertical synchronization signal Vsync determines a vertical period to display a frame image. The data enable signal DE determines a period to supply a data voltage to a pixel.

The source sampling clock SSC is provided to latch the data signals R, G, and B in the source driver 110. The source start pulse SSP is provided to indicate a starting point of a horizontal line, i.e., a first pixel of a horizontal line. The source output enable signal SOE is provided to control the output of the latched data signals from the source driver 110. The polarity reverse signal POL is provided to indicate polarities of the data voltage signals when the LCD device is operated with a polarity inversion driving method.

The gate shift clock GSC is provided to indicate a time when the gate voltage signals have a high or low (i.e., on or off) level. The gate output enable signal GOE is provided to control output of the gate voltage signals. The gate start pulse GSP is provided to indicate a starting line of a frame, i.e., a first gate line.

Based on the gate shift clock GSC, the gate driver 108 sequentially outputs the gate voltage signals to the gate lines using a shift register in the gate driver 108. Based on the source sampling clock SSC, the source start pulse SSP, the source output enable signal SOE and the polarity reverse signal POL, the source driver 110 generates the data voltage signals corresponding to the data signals R, G, and B, and outputs the data voltage signals to the corresponding data lines.

When the gate start pulse GSP is supplied to the gate driver 108 and the gate shift clock GSC is set to a high level in the first horizontal period, the gate voltage signal of the first gate line is set to a high level. When the gate shift clock GSC is set to a high level in the next horizontal period, the gate voltage signal of the second gate line is set to a high level. When the high levels of the gate voltage signals supplied to the first and second gate lines overlap each other, a malfunction occurs. To prevent this, the gate output enable signal GOE is normally set high before the gate voltage signal of the second gate line is set high. Accordingly, the gate voltage signal of the first gate line is set to a low level before the gate voltage of the second gate line is set to a high level. A predetermined interval or gap is provided between the high levels of the gate voltage signals of the first and second gate lines. In this manner, the high levels of the gate voltage signals supplied to successive gate lines are sequentially output from the gate driver 108 without overlapping one another.

When the source start pulse SSP is supplied to the source driver 110 and the source sampling clock SSC is set to a high level, the data signals R, G, and B are latched in a latch (not shown) of the source driver 110. Then, based on the source output enable signal SOE, the data signals R, G, and B of a digital type are decoded into the data voltage signals of an analog type in a decoder (not shown) of the source driver 110. The decoder is supplied with the polarity reverse signal POL and outputs the data voltage signals having positive and negative polarities according to the inversion driving method of the LCD device.

As illustrated in FIG. 3B, the timing controller 200 includes a state judging portion 250, a control signal generating portion 240, and a data signal processing portion 280.

The state judging portion 250 includes a detecting portion 210, a reference portion 220 and a comparing portion 230. The detecting portion 210 is supplied with the data enable signal DE from the interface 104 and detects an attribute of the data enable signal DE, for example, a width the data enable signal DE. The reference portion 220 has a reference attribute, e.g., width, of the data enable signal DE in a normal operating state. The comparing portion 230 compares the detected width and the reference width, and outputs a state signal as a result of the comparison. When the detected width and the reference width are substantially the same, the comparing portion 230 outputs a state signal having a value representative of the normal state. On the other hand, when the two widths are different, the comparing portion 230 outputs a state signal having a value representative of the abnormal state.

The control signal generating portion 240 is supplied with the horizontal synchronization signal Hsync and the vertical synchronization signal Vsync from the interface 104, and the state signal from the state judging portion 250. The control signal generating portion 240 generates the control signals for the gate and data drivers 108 and 110 according to the state signal.

The control signal generating portion 240 may optionally have a selecting circuit, such as a multiplexer. When the state signal has the value representative of the normal state, the selecting circuit selects and outputs the control signals for the gate and data drivers 108 and 110 corresponding to the normal state. The control signals for the normal state may be generated according to a typical control signal generating process under the normal operation.

Figure 4:
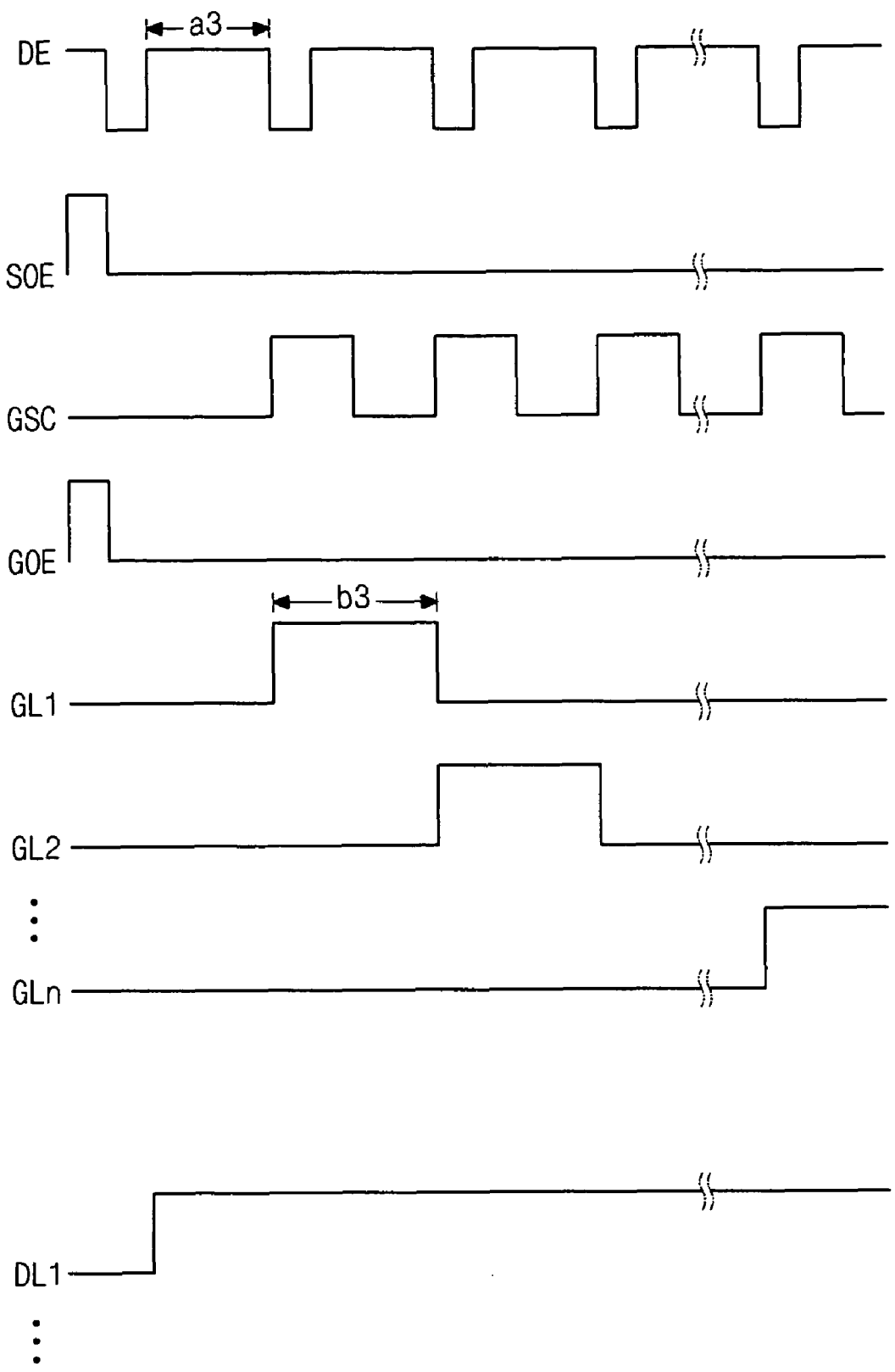
FIG. 4 is a waveform view illustrating control signals and gate and data voltage signals when a data enable signal has an abnormal state in the LCD device according to the embodiment of the present invention.

When the state signal has the value representative of the abnormal state, the selecting circuit selects and outputs the control signals for the gate and data drivers 108 and 110 corresponding to the abnormal state. For example, as illustrated in FIG. 4, when the state signal has the value representative of the abnormal state, one or both of the gate output enable signal GOE and the source output enable signal SOE are maintained at a low level. The other control signals are generated according to a typical control signal generating process.

As described above, because the gate output enable signal GOE has a low level during the abnormal state, there is little to no gap between the high levels of the gate voltage signals supplied to adjacent gate lines. For example, the gate voltage signal of the first gate line GL1 is set to a high level when the gate shift clock GSC is set high in the first horizontal period. Then, the gate voltage signal of the second gate line GL2 is set to a high level when the gate shift clock GSC is set high in the second horizontal period. Because the gate output enable signal GOE is maintained at a low level, the gate voltage signal of the first gate line GL1 is substantially maintained at the high level until the gate shift clock GSC is set high in the second horizontal period.

Figure 1:
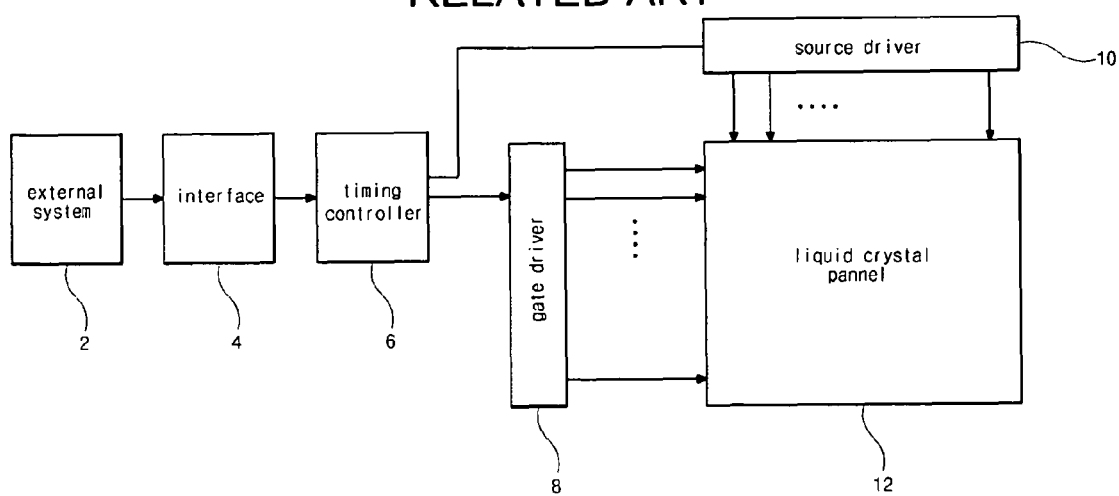
FIG. 1 is a block diagram illustrating an LCD device according to the related art.
Figure 2A:
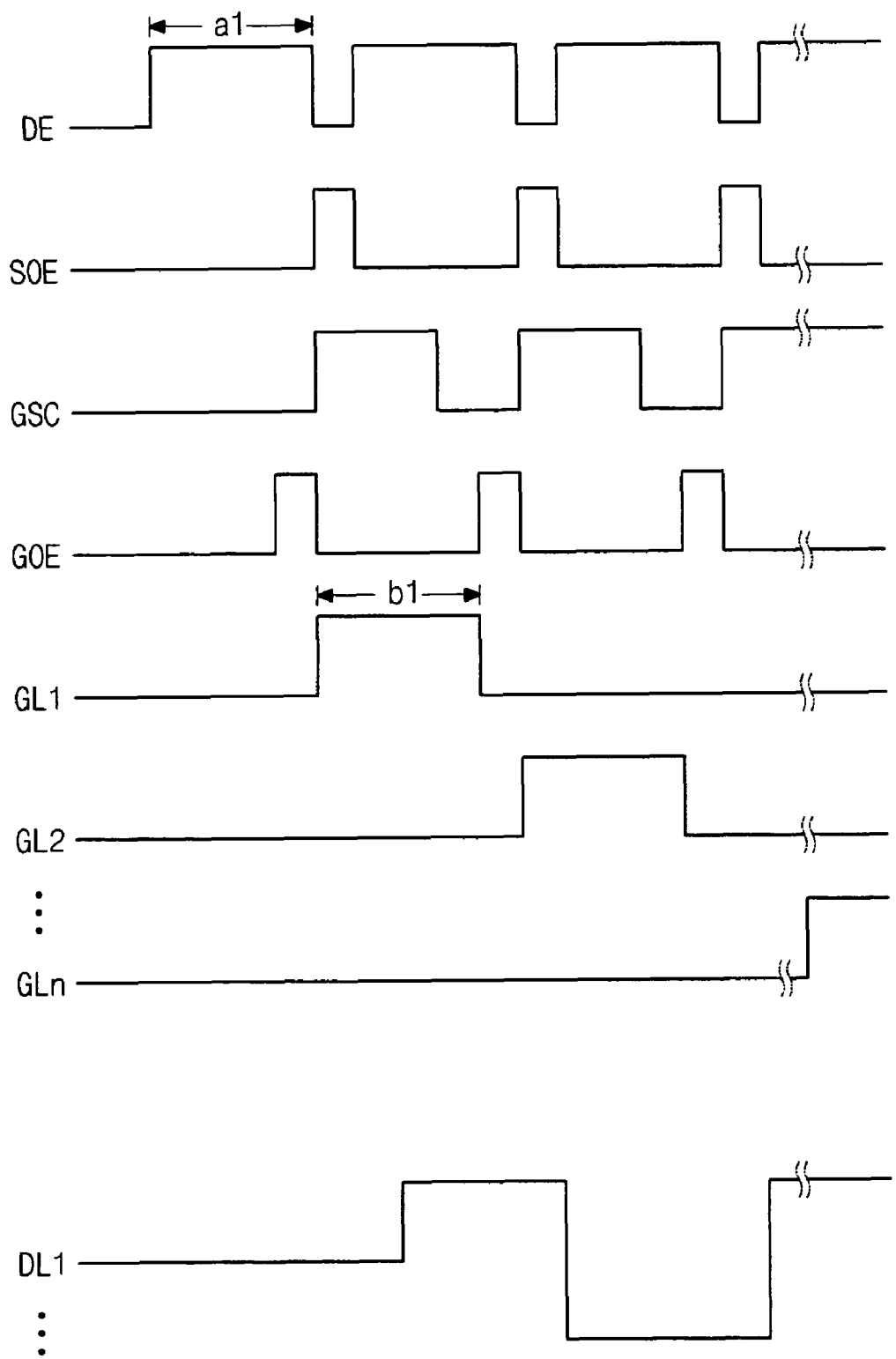

Accordingly, in the above embodiment according to the present invention, even in the abnormal state, the width of the gate voltage signals is maintained at b3, which is greater than the abnormal width b2 shown in FIG. 2B and is substantially similar to the normal width b1 shown in FIG. 2A. In other words, as the data enable signal DE changes from a normal state to an abnormal state, the data enable signal DE has a reduced width a3, which is similar to the abnormal width a2 shown in FIG. 2B and is substantially smaller than the normal width a1 shown in FIG. 2A. Also, the width and period of the gate shift clock GSC are similar to those in the abnormal state shown in FIG. 2B and are smaller than the width and the period in the normal operation as shown in FIG. 2A. However, the width b3 of the gate voltage signals is maintained substantially similar to the normal width b1 shown in FIG. 2A and is greater than the abnormal width b2 shown in FIG. 2B. This is because the gate output enable signal GOE is maintain at a low level during the abnormal state. As a result, the amount of time for charging pixel electrodes with the data voltage signals is maintained substantially similar to that in the normal state.

Further, because the data output enable signal SOE is maintained at a low level during the abnormal state, there is no polarity inversion of the data voltage signals supplied to each of the plurality of data lines, for example, data line DL1. For example, the data voltage signal supplied to the data line DL1 in the first horizontal period has a positive polarity according to the source sampling clock SSC. Because the data output enable signal SOE is maintained at a low level, the polarity of the data voltage signal supplied to the data line DL1 is not inverted in the next horizontal period and continues to be positive. Thus, the data voltage signal supplied to the data line DL1 continues to have the positive polarity during the abnormal state operation. Alternatively, the data voltage signal may maintain a negative polarity during the abnormal state operation. Because falling and rising times of the data voltage signals increase with polarity inversion, as shown in FIGS. 2A and 2B, a longer time is needed to charge pixel electrodes with data voltage signals when the polarity of the data voltage signals is inverted. By removing polarity inversion during the abnormal state operation, the amount of time needed to charge pixel electrodes sufficiently is reduced. As a result, even if the charging time is reduced in the abnormal state due to the decrease in the width of the gate voltage signals (e.g., b2 in FIG. 2B), the pixel electrodes can still be charged sufficiently.

As explained above, when the data enable signal DE is input with an abnormal state, the timing controller 200 detects the abnormal state and maintains one or both of the gate and data output enable signals GOE and SOE at a low level. Accordingly, the width of the gate voltage signals increases and/or the polarity inversion of the data voltage signal for each horizontal period is suspended. As a result, the charging time for pixel electrodes can increase and/or the charging time required to sufficiently charge pixel electrodes decreases. This can lead to a reduction in flickering, which in turn improves the display quality and reduce deterioration of liquid crystal.

It will be apparent to those skilled in the art that various modifications and variations can be made in the liquid crystal display device and method for driving the same according to the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal panel having a plurality of data lines and a plurality of gate lines;
   a timing controller to receive a data enable signal and a data signal, and to output a gate shift clock, a gate output enable signal, and a source output enable signal, wherein at least one of the gate output enable signal and the source output enable signal is maintained at a predetermined level during an abnormal state of the data enable signal;
   a source driver to supply the data lines with corresponding data voltage signals based on the data signal and the source output enable signal; and
   a gate driver to supply the gate lines with corresponding gate voltage signals based on the gate output enable signal,
   wherein the timing controller includes: a state judging portion to determine whether the data enable signal is in a normal state or the abnormal state; and a control signal generating portion to generate the gate and source output enable signals based on the determined state of the data enable signal,
   wherein the state judging portion includes: a detecting portion to detect an attribute of the data enable signal; a reference portion having a reference attribute of the data enable signal in the normal state; and a comparing portion to compare the detected attribute and the reference attribute and to output a state signal representing either the normal state or the abnormal state, and
   wherein the attribute of the data enable signal includes a width of the data enable signal.

2. The device of claim 1, wherein the control signal generating portion includes a selecting circuit to select the gate and source output enable signals based on the determined state of the data enable signal.

3. The device of claim 2, wherein the selecting circuit includes a multiplexer.

4. The device of claim 1, wherein the at least one of the gate output enable signal and the source output enable signal is maintained at a low level based on the state judging portion determining that the data enable signal has the abnormal state.

5. The device of claim 1, wherein the timing controller further includes a data signal processing portion to process the data signal and output the processed data signal to the source driver.

6. The device of claim 1, wherein the gate output enable signal is maintained low during the abnormal state of the data enable signal, and the gate voltage signals supplied to two adjacent gate lines have no gap between them while the gate output enable signal is maintained low.

7. The device of claim 1, wherein the source output enable signal is maintained low during the abnormal state of the data enable signal, and the data voltage signals maintain their polarity while the source output enable signal is maintained low.

8. The device of claim 1, wherein both of the gate output enable signal and the source output enable signal are maintained low during the abnormal state of the data enable signal.

9. A method of driving a liquid crystal display device having a plurality of data lines and a plurality of gate lines, the method comprising the steps of:
   receiving a data enable signal and a data signal;
   outputting a gate shift clock, a gate output enable signal, and a source output enable signal, wherein at least one of the gate output enable signal and the source output enable signal is maintained at a predetermined level during an abnormal state of the data enable signal;
   supplying the data lines with corresponding data voltage signals based on the data signal and the source output enable signal; and
   supplying the gate lines with corresponding gate voltage signals based on the gate output enable signal,
   wherein the step of outputting includes the steps of: judging whether the data enable signal is in a normal state or the abnormal state; and generating the gate and source output enable signals based on the judged state of the data enable signal,
   wherein the step of judging includes the steps of: detecting an attribute of the data enable signal; and comparing the detected attribute to a reference attribute of the data enable signal in the normal state, and
   wherein the attribute of the data enable signal includes a width of the data enable signal.

10. The method of claim 9, wherein the step of generating includes selecting the gate and source output enable signals based on the judged state of the data enable signal.

11. The method of claim 9, the step of generating includes maintaining the at least one of the gate output enable signal and the source output enable signal at a low level if the data enable signal is judged to have the abnormal state.

12. The method of claim 9, wherein the step of outputting further includes the step of processing the data signal.

13. The method of claim 9, wherein the gate output enable signal is maintained low during the abnormal state of the data enable signal, and the gate voltage signals supplied to two adjacent gate lines have no gap between them while the gate output enable signal is maintained low.

14. The method of claim 9, wherein the source output enable signal is maintained low during the abnormal state of the data enable signal, and the data voltage signals maintain their polarity while the source output enable signal is maintained low.

15. The method of claim 9, wherein both of the gate output enable signal and the source output enable signal are maintained low during the abnormal state of the data enable signal.

* * * * *